R. P. Bailey.
Dressing Stone.

N°66,990. Patented Jun. 25, 1867.

Witnesses.
J. A. Davis
J. C. Drake

Inventor
R. P. Bailey
by J. Fraser & co.
Attys.

United States Patent Office.

RALPH P. BAILEY, OF NIAGARA FALLS, NEW YORK.

Letters Patent No. 65,990, dated June 25, 1867.

IMPROVED MACHINE FOR DRESSING MARBLE.

*The Schedule referred to in these Letters Patent and making part of the same.*

TO ALL WHOM IT MAY CONCERN:

Be it known that I, RALPH P. BAILEY, of Niagara Falls, in the county of Niagara, and State of New York, have invented a new and improved Machine for Working, Dressing, and Ornamenting Marble, Stone, Slate, and other similar substances; and I do hereby declare that the following is a full and exact description thereof, reference being had to the accompanying drawings, in which—

Like letters designate corresponding parts in all of the figures.

Figure 2:
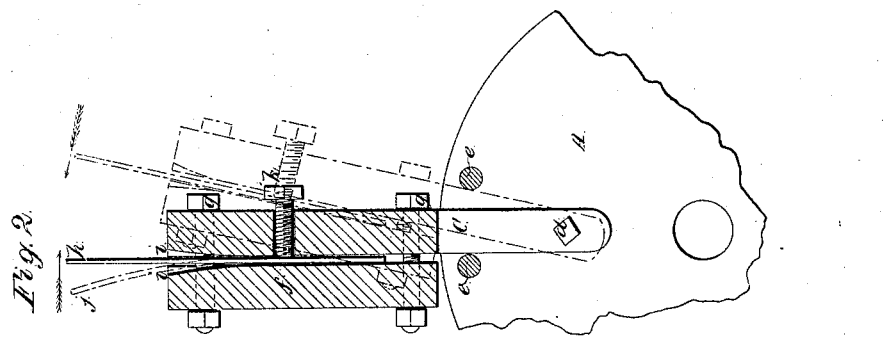
Figure 2 is an enlarged sectional view of a portion of the disk A, and one of the arms C and scrapers $h$ detached.
Figure 1:
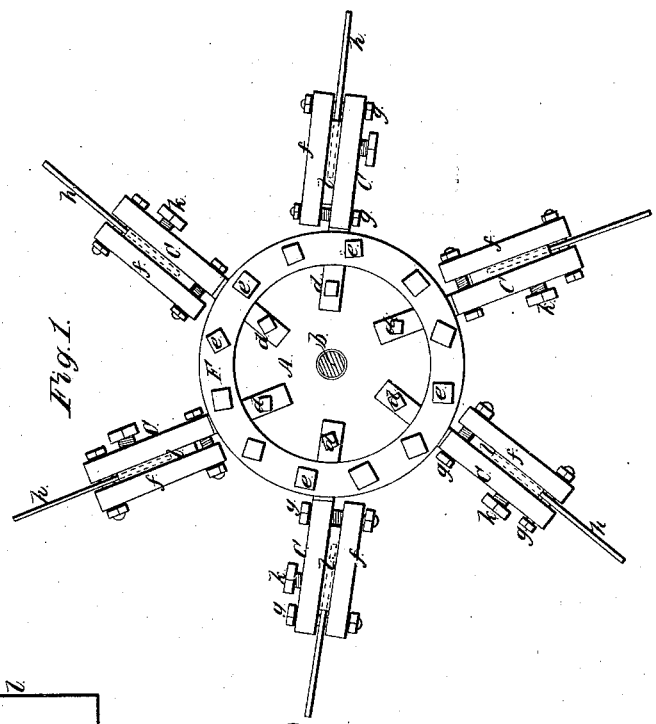
Figure 1 is an elevation of my improvement.
Figure 3:
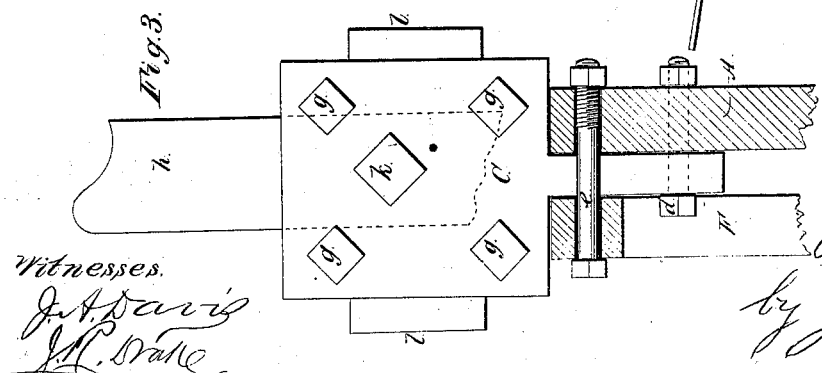
Figure 3 is an enlarged side view of one of the arms C with a portion of the disk's head in transverse section.

My invention is designed especially for the working of mouldings on slabs of marble, slate, &c., as required for mantel-shelves and tops of furniture, and consists of a series of flexible arms or scrapers provided with suitable blades of steel, or other suitable tool for the purpose, attached to a rotary or otherwise movable head or stock, whereby said blades are successively brought in contact with the stone, removing the superfluous parts by the gradual abrasion or scraping away thereof. As represented in the drawing—

A is a disk-shaped head or stock designed to be attached to any suitable rotating shaft $b$. To it are pivoted any required number of the arms C, by means of the pivots $d$, on which they vibrate to the extent permitted by the stock-bolts $e$ $e$, as shown most clearly by the red lines in fig. 2. These bolts serve the double purpose of bearings against which the arms rest and of securing the annular rim F to the head A, which rim holds the arms firmly against lateral displacement. Each arm is provided with a plate, $f$, secured to it by four bolts $g$ $g$, forming a clamp for holding the blade or scraper $h$, which consists of a plate of steel, preferably of uniform thickness and of any required length. This blade is held by a set-screw, $k$, passing centrally, or nearly so, through the holding portion of the arm C, and pressing that portion of the blade against the clamping-blade $f$. The surfaces of the plate and arm contiguous to the blade are bevelled away, as at $i$ $i$, to allow it to spring under the pressure with which it is applied, as shown in red lines at $j$, fig. 2. Keys $l$ $l$ are inserted in the holder at each side of the blade of suitable thickness to regulate the bearings. The blades are shaped at their ends to conform to the moulding or other ornament to be produced on the marble; being of steel sufficiently hard to remove, by scraping, a portion of the surface, when arranged in a head as shown, and revolving in contact with the edge or other portion of a slab of marble, one follows the other in quick succession, each removing a small portion, but in the aggregate executing with a rapidity exceeding by fivefold that of manual labor, and without the risk of breakage which attends the use of the chisel, while the work is smoothly wrought as it progresses, requiring only a slight polishing to finish it perfectly. Any number of arms and blades may be employed in the same head, limited only by the space on its periphery to attach them. Curved and serpentine mouldings are as readily worked as straight ones, requiring only that the diameter of the circle described by the blades shall be adapted to the radius of the curve of the moulding. The construction is such that the head may be revolved in either direction and work with the same efficiency as is shown by the diagram in red in fig. 2, where the red and black arms indicate the position of the arm when running in opposite directions. The yielding or elasticity of the blades, which is most conveniently obtained by forming them thin enough to spring slightly under the pressure applied, insures a steady and uniform feed to each, and the angle at which they are presented to the stone is such as to keep them self-sharpened, or nearly so, by the wear. The most effective position of the blades is one inclined slightly back of a radial line from the axis of the head. The blades may be of any suitable length, and each end may be formed of a different pattern, so that, by reversing, a differently formed moulding will be wrought.

What I claim as my invention, is—

The employment of a series of spring blades or scrapers $h$, in combination with the clamping-arms C, and head or stock A, for acting successively on the material to abrade it to the form of said blades, when constructed, arranged, and operating substantially as and for the purpose set forth.

I also claim the arm or holder C, when connected with the head A or its equivalent, by means of pivot $d$, and the bearing bolts $e$ $e$, arranged to allow the blades to adjust themselves to the work when rotated in either direction, substantially as set forth.

I also claim, in combination with the blade $h$, and its set-bolt $k$, the chamfering away of the clamp sides at $i$ $i$, substantially in the manner and for the purpose set forth.

In witness whereof I have hereunto signed my name in the presence of two subscribing witnesses.

RALPH P. BAILEY.

Witnesses:
 JAY HYATT,
 ALBERT HAIGHT.